Figure 1:
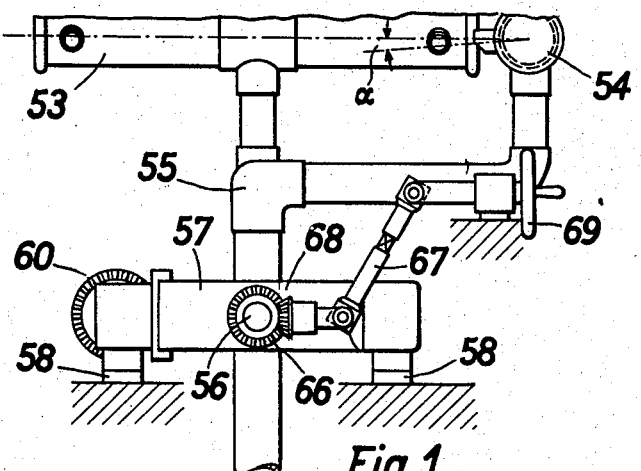

May 26, 1936.   O. EPPENSTEIN   2,042,040
SIGHT LINE HORIZON DETERMINING MEANS
Original Filed May 15, 1934

Inventor:
Otto Eppenstein

Patented May 26, 1936

2,042,040

UNITED STATES PATENT OFFICE 2,042,040

SIGHT LINE HORIZON DETERMINING MEANS

Otto Eppenstein, Jena, Germany, assignor to firm Carl Zeiss, Jena, Germany

Original application May 15, 1934, Serial No. 725,752. Divided and this application November 11, 1935, Serial No. 49,227. In Germany May 16, 1933

3 Claims. (Cl. 33—73)

I have filed applications in Germany, May 16, 1933; France, May 12, 1934 (Patent No. 773,222); Great Britain, May 14, 1934 (Patent No. 425,939); Russia, May 15, 1934; Italy, May 16, 1934 (Patent No. 321,035); Japan, May 16, 1934.

In my copending U. S. application Ser. No. 725,752, filed May 15, 1934, of which the present application is a division, is described an instrument for carrying into practice a method of determining a horizontal line through a point on board ship and at a known height above sea-level. In this method, the sought horizontal line is determined by maintaining the elevation of a stereoscopic rangefinder on board ship continuously so adjusted as to keep this rangefinder permanently directed to a point in the sea-level and at a constant distance from the finder, namely to the aiming point, the sought horizontal line being deduced from the consequent angle of elevation of the aiming point, at which angle the line connecting the rangefinder and this aiming point, namely the sighting line, is inclined relatively to the said horizontal line. The said stereoscopic rangefinder contains a stereoscopic mark at a constant apparent distance and a device for indicating the variations of that angle which is included between the sighting line and a line parallel to the ship's deck and at right angles to the base of the rangefinder. The said variations of angle, which are indicated by the device in the rangefinder, correspond to the oscillations of the ship in a plane at right angles to the base of the rangefinder and are equal to the variations of the angle of elevation of the rangefinder, which are due to the said oscillations of the ship.

In the said case, it is assumed that the support for the apparatus effects oscillations about one axis only, viz. about an axis parallel to the rangefinder base. However, this is not the case in practice, since oscillations about two axes at right angles relative to each other are generally concerned. The measuring results of the described apparatus will consequently contain certain errors which may be neglected so long as the variations of the angles are comparatively small. The said errors may be avoided completely by determining and stabilizing not only a straight line but by stabilizing two straight lines conveniently intersecting each other at right angles, that is to say a plane, which may be effected by using for the new method two instruments that have corresponding positions relatively to each other.

The present invention relates to sight line horizon determining means and has for its object an especially simple apparatus for the stabilization of the horizontal position of a plane surface of a body mounted on board ship. According to the invention the apparatus consists of two stereoscopic rangefinders having stereoscopic marks at a constant apparent distance and being rigidly connected to each other in such a manner that the bases of these rangefinders lie in a plane parallel to the plane to be stabilized and intersect each other, the rangefinders being cardanically so mounted on board ship that rotations of the rangefinders about the one Cardan axis entail corresponding variations of the elevation of one rangefinder, and that rotations about the other Cardan axis entail corresponding variations of the elevation of the other rangefinder. By means of the said apparatus, a correct stabilization of instruments mounted on board ship may be effected regardless of what oscillations the ship is exposed to.

Figure 2:
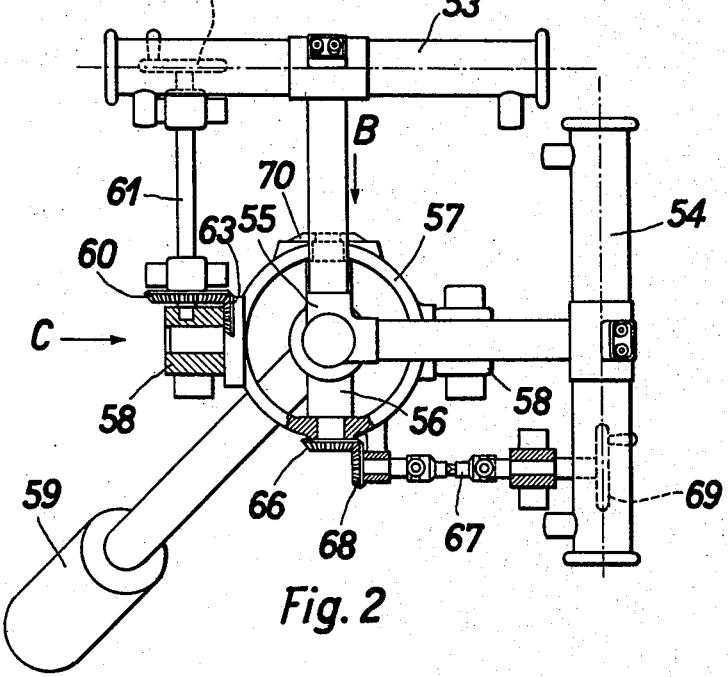
Figure 3:
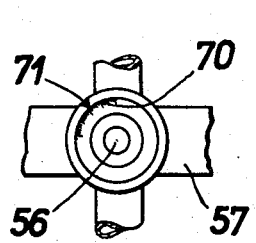
Figure 4:
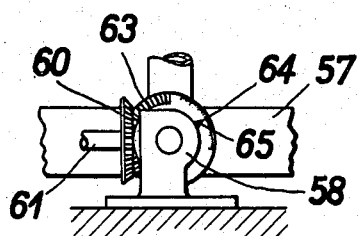

The accompanying drawing represents a constructional example of the invention. Figures 1 and 2 illustrate the example in elevation and in top view, respectively. Figures 3 and 4 show parts of the example, these two parts being seen in the directions of the arrows B and C, respectively, of Figure 2.

The constructional example (Figures 1 and 4) shows the application of the invention for stabilizing the horizontal position of a plane. The apparatus consists of two stereoscopic rangefinders 53 and 54 which are adjusted to a predetermined distance and whose bases lie normally in a plane parallel to the plane to be stabilized. The axes of the bases extended intersect each other at right angles. The lines of sight of the rangefinders 53 and 54 are inclined at an angle of elevation $\alpha$ relatively to the plane determined by the bases. The rangefinders 53 and 54 are rigidly connected to each other by means of a piece 55 rotatable about an axis 56 in a Cardan ring 57. The axle 56 is parallel to the base of the rangefinder 54. The Cardan ring 57 is rotatably mounted in bearings 58 which are provided on board ship and whose axis is at right angles to the axle 56 and, consequently, parallel to the axis of the rangefinder 53. The piece 55 has a counterweight 59 which makes the centre of gravity of the parts rigidly connected to the piece 55 lie at the centre of the Cardan bearing. A toothed wheel 60 having a fixed shaft 61 and a hand wheel 62 is rotatably mounted on one of the bearings 58. The toothed wheel 60 meshes with a toothed segment 63 on the Cardan ring 57. The toothed segment 63 has a graduation 64 which cooperates with an index 65 attached to the bearing 58. The axle 56 has a bevel wheel 66 which meshes with a bevel wheel 68 provided on a telescope shaft 67. The telescope shaft 67 ends in a hand wheel 69. The shaft 56 is provided with a graduation 70 cooperating with an index 71 on the ring 57. The hand wheels 62 and 69 lie below the rangefinders 53 and 54, respectively, in such a manner that they may be easily operated when observations are effected by means of the rangefinders.

When using the apparatus, the observers at the rangefinders 53 and 54 are to rotate the hand wheels 62 and 69 in such a manner as to keep the rangefinders continuously directed to a point which lies at the predetermined distance on the sea-level. The piece 55 and the parts rigidly connected to same are thus stabilized with respect to oscillations of the ship. The variations of the angles of elevation, which correspond to the oscillations of the ship, may be read at any time on the graduations 64 and 70, where they are indicated by the indices 65 and 72, respectively. Instead of these reading devices any mechanical or electric transmission devices of the known kind may be connected to the apparatus, by means of which the variations of the angles of elevation may be continuously transmitted to other apparatus on board ship, for instance to guns.

I claim:

1. An apparatus for stabilizing the horizontal position of a plane surface of a body mounted on board ship, the said apparatus consisting of two stereoscopic rangefinders rigidly connected to each other and having stereoscopic marks at a constant apparent distance, the bases of the rangefinders lying in one plane and being at right angles relatively to each other, means mounting the said rangefinders cardanically about axes respectively parallel to said bases so that rotations of the rangefinders about the one Cardan axis entail corresponding variations of the elevation of the one rangefinder and that rotations about the other Cardan axis entail corresponding variations of the elevation of the other rangefinder, and two devices connected to said Cardan axes respectively for controlling and indicating the angular movements of said finders about the respective Cardan axes.

2. In an apparatus according to claim 1, the said body being rigidly connected to the said two rangefinders, the weight and the arrangement of the body being so chosen that the resulting centre of gravity of the two rangefinders and the other parts rotatable about the said two Cardan axes lies approximately at the point of intersection of these axes.

3. In an apparatus according to claim 1, two gears for respectively rotating the two said rangefinders about the said two Cardan axes, a driving member so connected to each of the gears that an observer using a respective rangefinder may operate by hand during the observation that one of the two driving members whose operation effects bodily movement of the used rangefinder.

OTTO EPPENSTEIN.